US012773627B2

(12) United States Patent
Li et al.

(10) Patent No.: US 12,773,627 B2
(45) Date of Patent: Oct. 27, 2026

(54) METHOD, APPARATUS, ELECTRONIC DEVICE AND STORAGE MEDIUM FOR EXTENDING REALITY DISPLAY

(71) Applicant: Beijing Zitiao Network Technology Co., Ltd., Beijing (CN)

(72) Inventors: Lei Li, Beijing (CN); Xinyu Cui, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 143 days.

(21) Appl. No.: 18/441,753

(22) Filed: Feb. 14, 2024

(65) Prior Publication Data

US 2024/0269553 A1 Aug. 15, 2024

(30) Foreign Application Priority Data

Feb. 14, 2023 (CN) ......................... 202310143158.3

(51) Int. Cl.

| | |
|---|---|
| ***A63F 13/52*** | (2014.01) |
| ***A63F 13/355*** | (2014.01) |
| ***G06F 3/01*** | (2006.01) |
| ***G06F 3/14*** | (2006.01) |
| ***G06T 15/20*** | (2011.01) |
| ***G06T 17/00*** | (2006.01) |
| ***G06T 19/20*** | (2011.01) |

(52) U.S. Cl.
CPC .............. *A63F 13/52* (2014.09); *G06F 3/012* (2013.01); *G06F 3/1454* (2013.01); *G06T 15/20* (2013.01); *G06T 17/00* (2013.01); *G06T 19/20* (2013.01); *A63F 13/355* (2014.09); *A63F 2300/8082* (2013.01); *G06T 2219/024* (2013.01)

(58) Field of Classification Search
CPC .................... A63F 13/52; A63F 13/355; A63F 2300/8082; A63F 13/80; G06F 3/012; G06F 3/1454; G06T 15/20; G06T 17/00; G06T 19/20; G06T 2219/024; G06T 3/08; G06T 3/4038; G06T 2200/32
See application file for complete search history.

(56) References Cited

U.S. PATENT DOCUMENTS 9,167,226 B2 * 10/2015 Klein Gunnewiek ........................ H04N 13/111
9,392,212 B1 * 7/2016 Ross .................... H04N 5/9305
2010/0251101 A1 * 9/2010 Haussecker ............. G06T 17/05 715/243
2010/0328346 A1 * 12/2010 Watson ................. G06F 3/1446 345/649

(Continued)

*Primary Examiner* — Grant Sitta
(74) *Attorney, Agent, or Firm* — Astute IP Law Group

(57) ABSTRACT

The present disclosure provides an extended reality display method and apparatus, an electronic device and a storage medium. The extended reality display method includes: acquiring a view image corresponding to each user in response to a trigger operation for multi-user picture sharing; generating an extended reality spherical model according to the view image corresponding to each user, wherein the extended reality spherical model is formed by splicing the view images corresponding to the users; and displaying, at a head-mounted end of each user, a picture corresponding to the extended reality spherical model. By means of the method of the present disclosure, extended reality scenes of a plurality of users can be displayed at the head-mounted end of an extended reality device.

20 Claims, 4 Drawing Sheets

(56) References Cited

U.S. PATENT DOCUMENTS

| | | | | |
|---|---|---|---|---|
| 2011/0187704 | A1* | 8/2011 | Chen | G06T 17/00<br>345/419 |
| 2013/0293667 | A1* | 11/2013 | Guduru | G06Q 10/10<br>348/E7.083 |
| 2016/0360104 | A1* | 12/2016 | Zhang | B60R 1/27 |
| 2017/0336705 | A1* | 11/2017 | Zhou | G01S 3/00 |
| 2018/0074679 | A1* | 3/2018 | Wang | H04N 21/6587 |
| 2018/0095634 | A1* | 4/2018 | Alexander | G06F 3/04815 |
| 2018/0199042 | A1* | 7/2018 | Wang | H04N 19/167 |
| 2018/0374192 | A1* | 12/2018 | Kunkel | G06F 3/14 |
| 2020/0035203 | A1* | 1/2020 | Kosik | G06F 3/04815 |
| 2020/0084428 | A1* | 3/2020 | Oh | H04N 19/46 |
| 2021/0211631 | A1* | 7/2021 | Shin | G06F 3/013 |
| 2021/0329196 | A1* | 10/2021 | Boyce | G06T 3/16 |
| 2022/0358712 | A1* | 11/2022 | Woo | G06T 19/003 |
| 2024/0373085 | A1* | 11/2024 | Zhen | H04N 21/4316 |

* cited by examiner

METHOD, APPARATUS, ELECTRONIC DEVICE AND STORAGE MEDIUM FOR EXTENDING REALITY DISPLAY

CROSS-REFERENCE TO RELATED APPLICATION(S)

This application claims priority to Chinese Application No. 202310143158.3 filed Feb. 14, 2023, the disclosure of which is incorporated herein by reference in its entity.

FIELD

The present disclosure relates to the technical field of computers, and in particular to a method, an apparatus, an electronic device and a storage medium for extending reality display.

BACKGROUND

Extended reality (XR) refers to creating, by means of combining reality with virtuality through a computer, a virtual environment where human-computer interaction may be implemented. In related technologies, a single-player game scene of extended reality cannot provide a “game companion” function of a plurality of user players, that is, when the current user performs an extended reality game, the user cannot view the game process of other users at a “first perspective” in a field-of-view conversion manner.

SUMMARY

The Summary is provided to introduce concepts in a brief form, and these concepts will be described in detail in the following Detailed Description. The Summary is not intended to identify key features or essential features of claimed technical solutions, nor is it intended to be used for limiting the scope of the claimed technical solutions.

The present disclosure provides a method and apparatus, an electronic device and a storage medium for extending reality display.

The present disclosure utilizes the following technical solutions.

In some embodiments, the present disclosure provides a method for extended reality display, including:

- acquiring a view image corresponding to each user in response to a trigger operation for multi-user picture sharing;
- generating an extended reality spherical model according to the view image corresponding to each user, the extended reality spherical model is formed by splicing the view images corresponding to each user; and
- displaying, at a head-mounted end of each user, a picture corresponding to the extended reality spherical model.

In some embodiments, the present disclosure provides an apparatus for extending reality display, including:

- an acquisition module configured to acquiring a view image corresponding to each user in response to a trigger operation for multi-user picture sharing;
- a processing module, configured to generate an extended reality spherical model according to the view image corresponding to each user, the extended reality spherical model is formed by splicing the view images corresponding to each user; and
- a display module configured to display, at a head-mounted end of each user, a picture corresponding to the extended reality spherical model.

In some embodiments, the present disclosure provides an electronic device, including: at least one memory and at least one processor,

- wherein the memory is configured to store program codes, and the processor is configured to call the program codes stored in the memory to execute the method described above.

In some embodiments, the present disclosure provides a computer-readable storage medium, which is configured to store program codes, wherein the program codes cause, when operated by a processor, the processor to execute the method described above.

The extended reality display method provided in the embodiments of the present disclosure includes: acquiring a view image corresponding to each user in response to a trigger operation for multi-user picture sharing; generating an extended reality spherical model according to the view image corresponding to each user, the extended reality spherical model is formed by splicing the view images corresponding to each user; and finally displaying, at a head-mounted end of each user, a picture corresponding to the extended reality spherical model. By means of the method of the present disclosure, extended reality scenes of a plurality of users can be displayed at the head-mounted end of an extended reality device.

BRIEF DESCRIPTION OF THE DRAWINGS

The above and other features, advantages and aspects of various embodiments of the present disclosure will become more apparent in combination with the drawings and with reference to specific implementations. Throughout the drawings, the same or similar reference signs indicate the same or similar elements. It should be understood that the drawings are schematic and that components and elements are not necessarily drawn to scale.

DETAILED DESCRIPTION OF EMBODIMENTS

Figure 1:
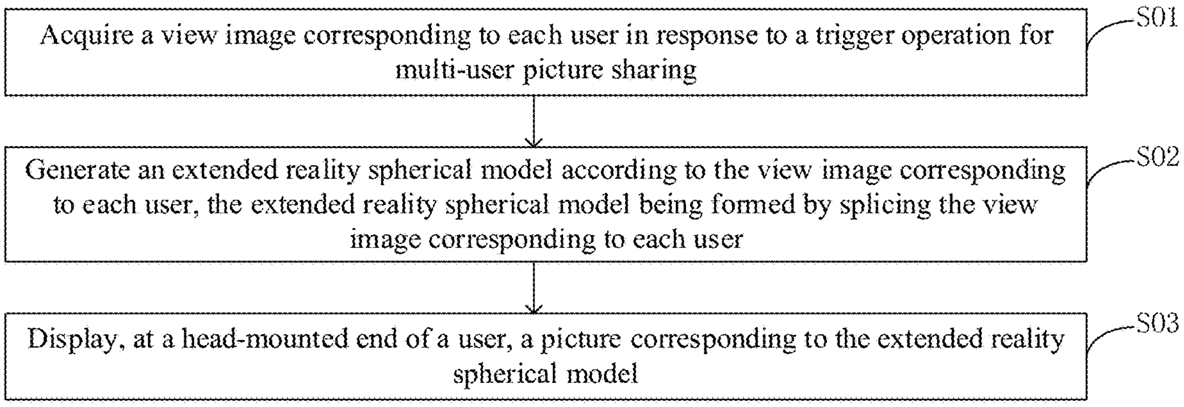
FIG. 1 is one of flowcharts of the methods for extending reality display according to an embodiment of the present disclosure.

Hereinafter, the embodiments of the present disclosure will be described in more detail with reference to the drawings. Although some embodiments of the present disclosure have been illustrated in the drawings, it should be understood that, the present disclosure may be implemented in various forms and should not be construed as being limited to the embodiments set forth herein; and rather, these embodiments are provided to help understand the present disclosure more thoroughly and completely. It should be understood that, the drawings and embodiments of the present disclosure are for exemplary purposes only and are not intended to limit the protection scope of the present disclosure.

It should be understood that, various steps recited in method embodiments of the present disclosure may be executed in an and/or manner in parallel. In addition, the method embodiments may include additional steps and/or omit the execution of the steps shown. The scope of the present disclosure is not limited in this respect.

As used herein, the terms “include” and variations thereof are open-ended terms, i.e., “including, but not limited to”. The term “based on” is “based, at least in part, on”. The term “one embodiment” means “at least one embodiment”; the term “another embodiment” means “at least one additional embodiment”; the term “some embodiments” means “at least some embodiments”. Relevant definitions of other terms will be given in the following description. The term “in response to” and related terms refer to that a signal or event is affected by another signal or event to a certain extent, but is not necessarily completely or directly affected. If an event x occurs “in response to” an event y, x may respond to y directly or indirectly. For example, the occurrence of y may eventually lead to the occurrence of x, but other intermediate events and/or conditions may be present. In other cases, y may not necessarily lead to the occurrence of x, and x may also occur even if y does not occur. In addition, the term “in response to” may also mean “in response to at least in part”.

The term “determining” broadly encompasses a wide variety of actions, which may include acquiring, calculating, computing, processing, inferring, investigating, searching for (e.g., searching for tables, databases or other data structures), ascertaining and similar actions, and may also include receiving (e.g., receiving information), accessing (e.g., accessing data in a memory) and similar actions, as well as parsing, selecting, choosing, establishing and similar actions, etc. The relevant definitions of other terms will be given in the following description.

It should be noted that, concepts such as “first” and “second” mentioned in the present disclosure are only intended to distinguish between different apparatuses, modules or units, and are not intended to limit the sequence or interdependence of functions executed by these apparatuses, modules or units.

It should be noted that, modifiers such as “one” mentioned in the present disclosure are intended to be illustrative and not restrictive, and those skilled in the art should understand that they should be interpreted as “one or more” unless the context clearly indicates otherwise.

The names of messages or information interacted between a plurality of apparatuses in the embodiments of the present disclosure are for illustrative purposes only and are not intended to limit the scope of such messages or information.

The solutions provided in the embodiments of the present disclosure will be described in detail below in combination with the drawings.

As shown in FIG. 1, FIG. 1 is a flowchart of an extended reality display method according to an embodiment of the present disclosure, and the method includes the following steps.

Step S01: in response to a trigger operation for multi-user picture sharing, acquiring a view image corresponding to each user in response to a trigger operation for multi-user picture sharing.

In some embodiments, a common extended reality video, such as a virtual reality (VR) video, is a spherical model, a user is equivalent to standing at the center of a sphere and looking outwards, and the field of view of human eyes is limited, therefore the user can only see some pictures of a 360-degree spherical surface, and only when the user rotates the field of view, the user may see images corresponding to spherical surfaces in other directions. An extended reality spherical model is obtained by rendering the panoramic image. Therefore, a cloud server may acquire, in response to the trigger operation for multi-user picture sharing, the spherical model corresponding to each user, and acquire, on the basis of the respective spherical model, the panoramic image corresponding to an extended reality scene. For example, segmenting, twisting, stretching and splicing processing are performed on the spherical model in sequence to obtain the panoramic image. The spherical model corresponding to each user is obtained by a cloud server rendering a game image according to sensor data uploaded by each user and by means of a respective game engine, and performing compression and distortion rendering on the image.

In some embodiments, in response to the trigger operation for multi-user picture sharing may be understood as the cloud server receiving a picture sharing request signal initiated by a master user and receiving a picture sharing request acceptation signal determined by a secondary user.

In some embodiments, the present disclosure is applicable to a game scene in which the game picture direction is single or there is no need for the user to rotate a head-mounted device by a wide margin (in related arts, the field of view of the game picture is switched in a follow-up switching mode, for example, following a handle key or a joystick, instead of being achieved by operations, for example, the user turning around in situ, or frequently turning the head, and the like). It should be noted that in the related arts, in order to achieve a “game companion” function of a multi-player game, a screen partition display mode is utilized, this mode is mostly used for a 2D game scene of a non-virtual reality game, or is projected into a virtual reality head-mounted display in a desktop screen-recording mode for display. However, no matter which display mode is utilized, in a virtual reality scene, the game picture may only be displayed in a desktop screen-mirroring mode, the screen-mirroring position is located in the field-of-view direction of the user, thereby shielding the own game picture of the user, and thus the experience feeling is poor.

In some embodiments, a master user end initiates a “game companion” request, and after the other two users accept the request, the cloud server intercepts, at a specified field of view, images of some spherical models from the respective spherical models of the three users. Specifically, the cloud server segments, at the specified field of view, the panoramic images corresponding to the respective spherical models of the three users, to respectively obtain the view images of the three users.

Step S02: generating an extended reality spherical model according to the view image corresponding to each user, wherein the extended reality spherical model is formed by splicing the view images corresponding to the users.

In some embodiments, the view images, which are obtained after segmentation, are spliced and integrated into a new spherical model in the cloud server.

Step S03: displaying, at a head-mounted end of each user, a picture corresponding to the extended reality spherical model.

In some embodiments, according to the sensor data uploaded by the master user, an image corresponding to a "viewport" of the master user is intercepted from the new spherical model, and the image is downloaded to the head-mounted display of the master user end for display. It should be noted that, each user may switch to a "game companion" mode to become a "master user" of the his/her own local end.

The extended reality display method provided in the embodiments of the present disclosure includes: acquiring a view image corresponding to each user in response to a trigger operation for multi-user picture sharing; generating an extended reality spherical model according to the view image corresponding to each user, wherein the extended reality spherical model is formed by splicing the view images corresponding to the users; and finally displaying, at a head-mounted end of each user, a picture corresponding to the extended reality spherical model. By means of the method of the present disclosure, extended reality scenes of a plurality of users can be displayed at the head-mounted end of an extended reality device.

In some embodiments, the step of acquiring a view image corresponding to each user in response to a trigger operation for multi-user picture sharing includes:

- acquiring a panoramic image of each user in an extended reality scene thereof in response to a trigger operation for multi-user picture sharing;
- segmenting the panoramic image of each user respectively to obtain a view image corresponding to each user.

In some embodiments, the step of acquiring the panoramic image of each user in the extended reality scene thereof comprises:

- performing segmentation processing on the extended reality spherical model corresponding to each user to obtain the panoramic image of each user in the extended reality scene thereof In some embodiments, responding to the trigger operation for multi-user picture sharing includes:

- responding to a trigger operation for a picture sharing request, which is initiated by a master user, and responding to a trigger operation for accepting the picture sharing request by a secondary user.

In some embodiments, the view image is a field-of-view picture of the user in the current extended reality scene.

In some embodiments, the step respectively segmenting the panoramic image of each user to obtain the view image corresponding to each user, includes:

- segmenting the panoramic image of each user according to a preset field-of-view allocation rule to obtain the view image corresponding to each user.

In some embodiments, the step of segmenting the panoramic image of each user according to the preset field-of-view allocation rule includes:

- respectively segmenting the panoramic image of the master user and the panoramic images of the secondary users according to the size of a preset field of view of the master user and the number of secondary users.

In some embodiments, the field of view (FOV) refers to an included angle between the edge of a display and a connecting line of observation points (eyes of the user) in a display system. For the head-mounted display, the optimal field of view is 120°. This is because in a normal state, the transverse width of the most relaxed left-right glance of human eyes is 120°, and the extremity is close to 180°. The picture presented by the extended reality head-mounted display needs to conform to human body structures and behavior habits, so as to ensure the implementation of immersion. It should be noted that, the "field of view" mentioned in the present disclosure is not a hardware parameter of the extended reality head-mounted device of the user, but is a concept used for panoramic image segmentation.

Figure 2:
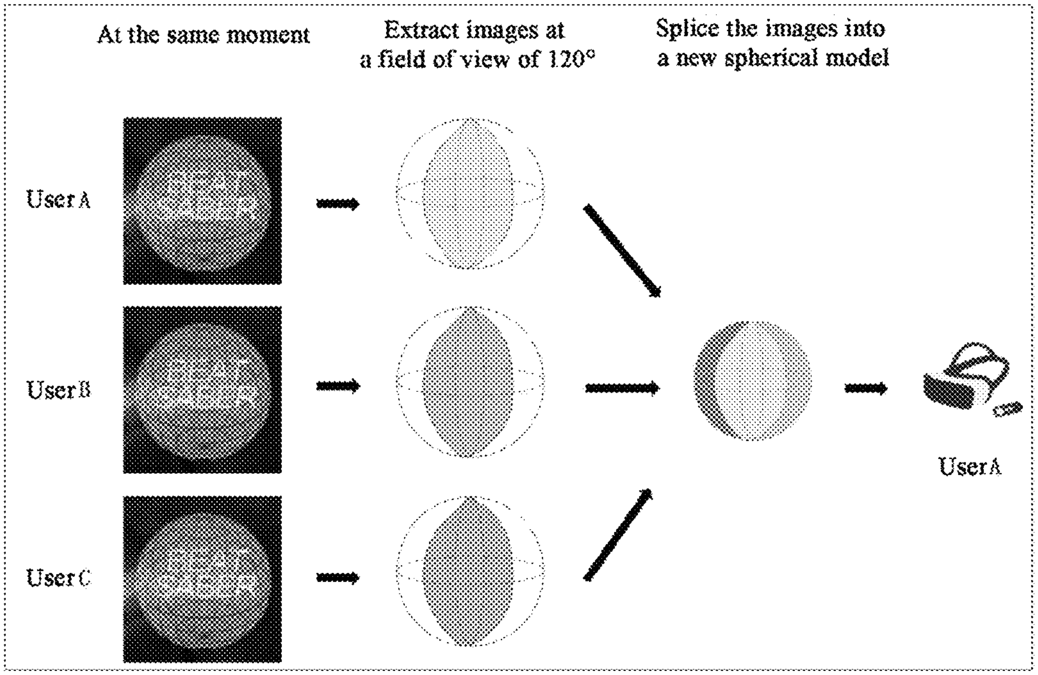
FIG. 2 is a schematic diagram of synthesis of an extended reality spherical model according to an embodiment of the present disclosure.

In some embodiments, as shown in FIG. 2, in order to achieve a multi-player game "companion" or "interaction" function in the extended reality scene, the present disclosure provides an extended reality display method. Taking a multi-player game involving three users as an example, the field of view of each user is 120° (which may achieve a better VR immersive experience effect), and game pictures of the three game players are spliced into one spherical model in the present disclosure. Specifically, after a user A initiates a "game companion" request, the game pictures of a plurality of game players including the user A are acquired from the re-spliced extended display spherical model, and finally, synchronous partition display is performed on the game pictures at the head-mounted end of the user A. In addition, for a scene including more than three users, in addition to the extended reality scene of the current master user (the virtual reality immersive experience of the current user is ensured, and the field of view thereof should be kept at a level of 120°), when the view images (field-of-view images) of the other game users are extracted, adjustment may be performed according to the segmentation situations, that is, angles (360°−120°) which the field-of-view images extracted from other "game companion" users need to be segmented, the regions of the remaining spherical model may be equally allocated or allocated according to other user-defined proportions, which is not specifically limited herein. In addition, if it is a "game companion" scene of two users, one extended reality spherical model may be spliced in a 180°+180° manner, which is equivalent to that the front hemisphere is a game scene view of the master user, while the back hemisphere is the game scene view of the companion.

In some embodiments, the step displaying, at the head-mounted end of each user, the picture corresponding to the extended reality spherical model, includes:

- acquiring sensor data of the head-mounted end which is uploaded by the master user;
- according to the sensor data, determining, from the extended reality spherical model, a view image corresponding to the current field of view of the master user; and
- displaying the view image at the head-mounted end of the master user.

In some embodiments, the method further includes:

- in response to a trigger operation for local loading, acquiring a panoramic video image of a local archive of an extended reality device;
- segmenting at least one panoramic video image according to the preset field-of-view allocation rule to obtain at least one view image;
- splicing the at least one view image to generate the extended reality spherical model; and
- displaying, at the head-mounted end of the extended reality device, the picture corresponding to the extended reality spherical model.

In some embodiments, the extended reality display method provided in the present disclosure may be applied to multi-user networking cloud game scene spliced display or synchronous playback of a plurality of local archive backups of a single-player game scene.

In some embodiments, the local archive solution may be used for a single-device or multi-user scene. Due to the limitation of the number of devices, a plurality of users may only use one device in turn. Under this condition, if the "companion" function of the game is desired, it may be simulated and implemented by reading a game archive. It can be understood that, by means of calling the archive, the user may compare his/her own performance in the same game scene, which is suitable for scenes such as game training.

Figure 5:
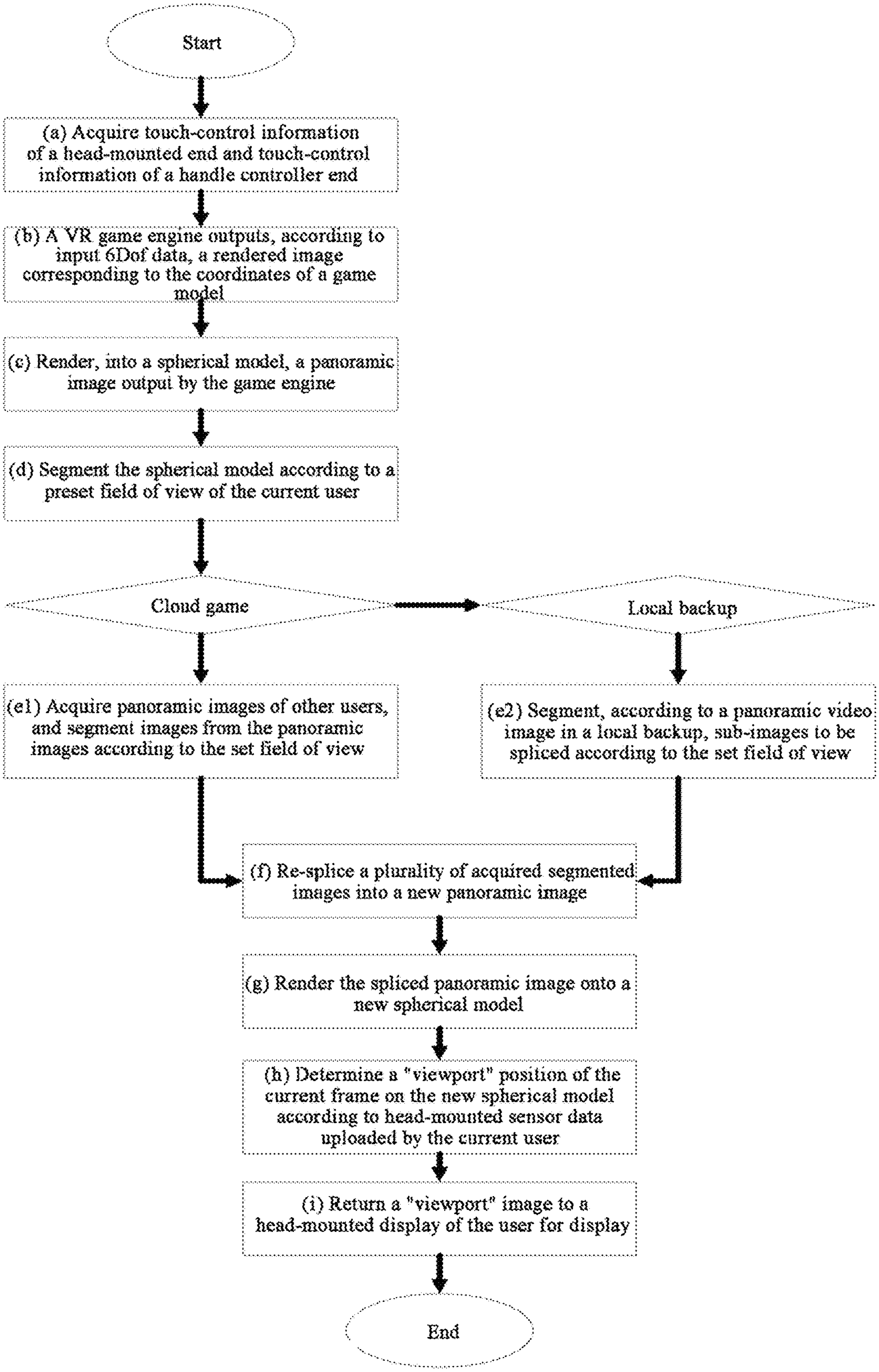
FIG. 5 is a second flowchart of a method for extending reality display according to an embodiment of the present disclosure.

In some embodiments, as shown in FIG. 5, the method for extending reality display provided in the present disclosure includes:

Step a: acquiring touch-control information of a head-mounted end and touch-control information of a handle controller end.

In some embodiments, a game engine needs to render a game screen according to sensor data of the head-mounted end and sensor data of a handle, which are uploaded by a user.

Step b: a VR game engine outputs, according to input 6Dof data, a rendered image corresponding to the coordinates of a game model.

In some embodiments, a panoramic image is output herein and is rendered onto a VR spherical model.

Step c: rendering, into a spherical model, a panoramic image output by the game engine.

In some embodiments, the panoramic image output by the game engine is rendered into the VR spherical model, then a "viewport" position is determined according to the head-mounted sensor data of the user, next, an image corresponding to the "viewport" position is determined to be the current frame, and the current frame is returned to the head-mounted end for decoding and displaying.

Step d: segmenting the spherical model according to a preset field of view of the current user.

In some embodiments, when the spherical model is segmented, the panoramic image may be also actually segment directly. In order to ensure the immersive experience of the current user, no matter how the fields of view of other users are segmented, it should be ensured that the field of view of the current master user is within a horizontal range of 120°. Taking a multi-user (N-user) game scene as an example, the field of view of the current master user is 120°, then the fields of view of the rest (N−1) users are allocated in the range of (360°−120°. The allocation principle may be equal division and may also be division according to a self-defined rule.

Step e1: acquiring panoramic images of the other users, and segmenting images from the panoramic images according to the set field of view.

Figure 3:
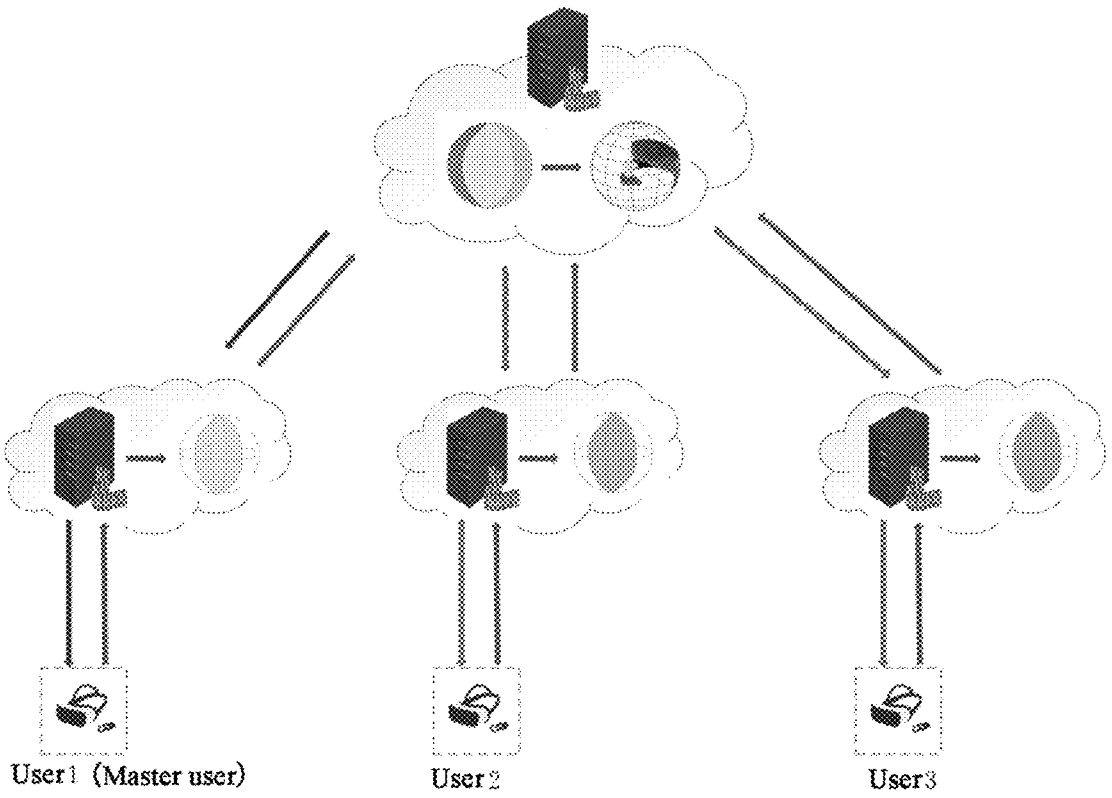
FIG. 3 is a schematic diagram of a data processing flow of multi-user sharing according to an embodiment of the present disclosure.

In some embodiments, as shown in FIG. 3, the embodiments of the present disclosure may perform multi-user networking cloud game scene spliced display.

Step e2: segmenting, according to a panoramic video image in a local backup, sub-images to be spliced according to the set field of view.

In some embodiments, a segmented field-of-view image of the current master user is spliced with the segmented field-of-view segmented images in a backup 2 and a backup 3 of a previous local archive. It should be noted that the archive data of the backups should be panoramic video data.

Figure 4:
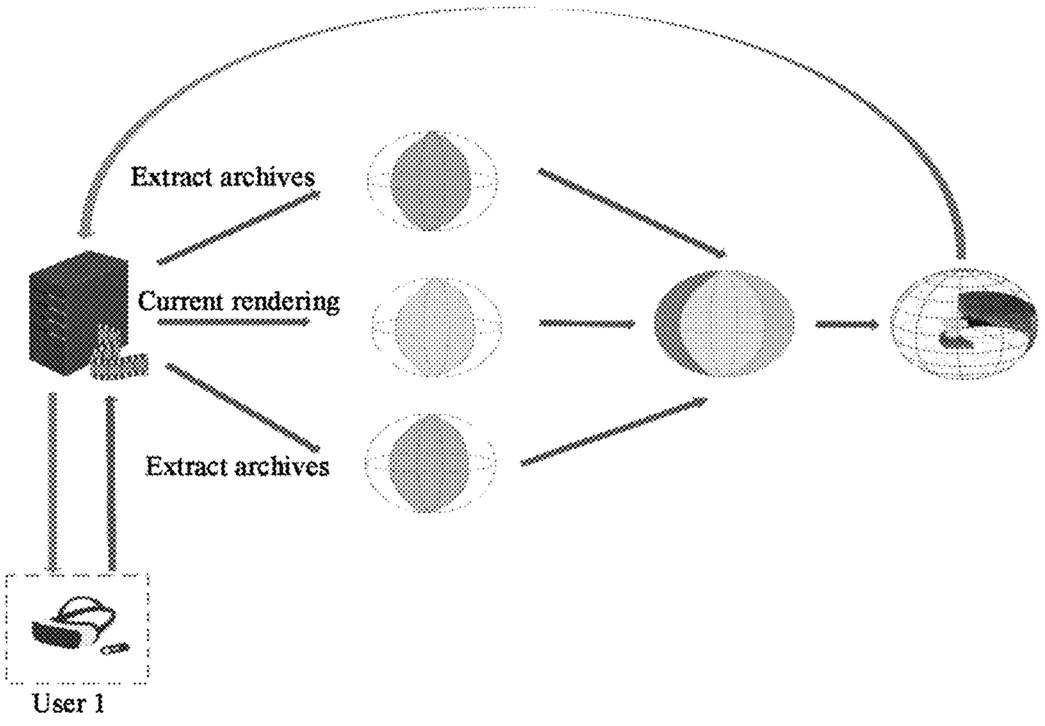
FIG. 4 is a schematic diagram of a data processing flow of a local archive according to an embodiment of the present disclosure.

In some embodiments, as shown in FIG. 4, the embodiments of the present disclosure may perform synchronous playback of a plurality of local archive backups in a single-player game scene. Step f: re-splicing a plurality of acquired segmented images into a new panoramic image.

In some embodiments, the plurality of acquired segmented images are re-spliced into a new panoramic image, for example, segmented field-of-view images, which are acquired from a user 1, a user 2 (backup 2) and a user 3 (or backup 3), are spliced into a new panoramic image.

Step g: rendering the spliced panoramic image onto a new spherical model.

In some embodiments, after the new panoramic image is acquired, it needs to be rendered onto a new VR spherical model, thereby completing the construction of the new spherical model.

Step h: determining a "viewport" position of the current frame on the new spherical model according to head-mounted sensor data uploaded by the current user; and step i: returning a "viewport" image to a head-mounted display of the user for display.

In some embodiments, the solutions provided in related arts may only display the own game scene of the user at the VR head-mounted end no matter in cloud games or local games. According to the extended reality display method provided in the present disclosure, a simultaneous game picture of a plurality of "game companions" can be viewed in one user scene by means of segmenting the panoramic image in different "fields of view", re-splicing the new panoramic image and reconstructing the VR spherical model. The embodiments of the present disclosure are the same as 2D projection playback of desktop screen-recording, and achieves true handover of a virtual reality scene between different user game scenes. In the embodiments of the present disclosure, there is no need to perform logical modification on the existing VR game single-player mode, and the "fields of view" of the rest participating users other than the master user may be equally allocated, and a user-defined allocation proportion may also be set. In the embodiments of the present disclosure, a game panoramic video in a local backup may be added into a "game companion" as a special user, and may be used for self-comparison of players, and the like.

Figure 6:
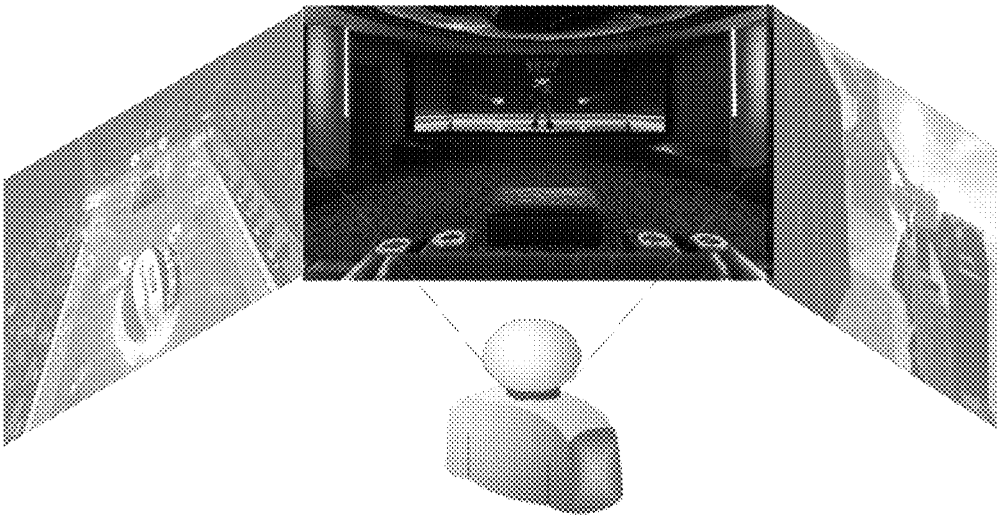
FIG. 6 is an effect diagram of extended reality display according to an embodiment of the present disclosure.

In some embodiments, when the user turns on a "companion" mode, the scene effect shown in FIG. 6 may be implemented. As shown in FIG. 6, when the user 1 turns the head, for example, turns right, the user 1 may see a game scene picture of the user 2 (playing CS in a virtual reality version); and when the user 1 turns the head left, the user 1 may see that the user 3 is watching the picture of a basketball game of VR live broadcast.

In some embodiments, an embodiment of the present disclosure further provides an extended reality display apparatus, including:

- an acquisition module, configured to acquiring a view image corresponding to each user in response to a trigger operation for multi-user picture sharing;
- a processing module configured to generate an extended reality spherical model according to the view image corresponding to each user, wherein the extended reality spherical model is formed by splicing the view images corresponding to the users; and
- a display module configured to display, at a head-mounted end of each user, a picture corresponding to the extended reality spherical model.

In some embodiments, the acquisition module is specifically configured to:

- acquire a panoramic image of each user in an extended reality scene thereof in response to a trigger operation for multi-user picture sharing;
- segment the panoramic image of each user respectively to obtain a view image corresponding to each user.

In some embodiments, the acquisition module is specifically configured to:

perform segmentation processing on the extended reality spherical model corresponding to each user, so as to obtain the panoramic image of each user in the extended reality scene thereof.

In some embodiments, the acquisition module is further specifically configured to:

in response to a trigger operation for a picture sharing request, which is initiated by a master user, and in response to a trigger operation for accepting the picture sharing request by a secondary user.

In some embodiments, the view image is a field-of-view picture of the user in the current extended reality scene.

In some embodiments, the first processing module is specifically configured to:

segment the panoramic image of each user according to a preset field-of-view allocation rule to obtain the view image corresponding to each user.

In some embodiments, the first processing module is further specifically configured to:

respectively segment the panoramic image of the master user and the panoramic images of the secondary users according to the size of a preset field of view of the master user and the number of secondary users.

In some embodiments, the display module is specifically configured to:

acquire sensor data of the head-mounted end, which is uploaded by the master user;

according to the sensor data, determine, from the extended reality spherical model, a view image corresponding to the current field of view of the master user; and display the view image at the head-mounted end of the master user.

In some embodiments, the acquisition module is further specifically configured to:

in response to a trigger operation for local loading, acquire a panoramic video image of a local archive of an extended reality device;

respectively, the first processing module is further specifically configured to:

segment at least one panoramic video image according to the preset field-of-view allocation rule to obtain at least one view image;

respectively, the second processing module is further specifically configured to:

splice the at least one view image to generate the extended reality spherical model; and respectively, the display module is further specifically configured to:

display, at the head-mounted end of the extended reality device, the picture corresponding to the extended reality spherical model.

Since the apparatus embodiments basically correspond to the method embodiments, with regard to related parts, reference may be made to the description of the method embodiments. The apparatus embodiments described above are merely illustrative, wherein the modules described as separate modules may be separated from each other or not. Some or all of the modules may be selected according to actual needs to achieve the objectives of the solutions of the embodiments. Those ordinary skills in the art may understand and implement the apparatus embodiments without creative efforts.

The method and apparatus of the present disclosure are described above based on the embodiments and the application examples. In addition, the present disclosure further provides an electronic device and a computer-readable storage medium, and the electronic device and the computer-readable storage medium are described below.

Figure 7:
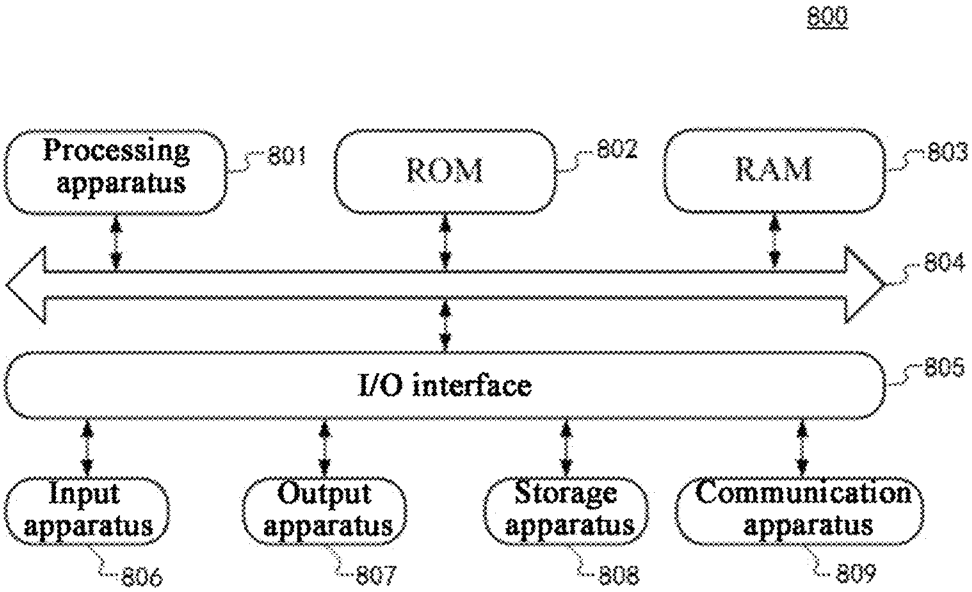
FIG. 7 is a schematic structural diagram of an electronic device according to an embodiment of the present disclosure.

Referring to FIG. 7, it illustrates a schematic structural diagram of an electronic device (e.g., a terminal device or a server) 800 suitable for implementing the embodiments of the present disclosure. The terminal device in the embodiments of the present disclosure may include, but is not limited to, mobile terminals such as mobile phones, notebook computers, digital broadcast receivers, PDAs (personal digital assistants), PADs (portable Android devices), PMPs (portable media players), vehicle-mounted terminals (e.g., vehicle-mounted navigation terminals), and the like, and fixed terminals such as digital TVs, desktop computers, and the like. The electronic device shown in the figure is merely an example, and should not bring any limitation to the functions and usage ranges of the embodiments of the present disclosure.

The electronic device 800 may include a processing apparatus (e.g., a central processing unit, a graphics processing unit, or the like) 801, which may perform various suitable actions and processing in accordance with a program stored in a read-only memory (ROM) 802 or a program loaded from a storage apparatus 808 into a random access memory (RAM) 803. In the RAM 803, various programs and data needed by the operations of the electronic device 800 are also stored. The processing apparatus 801, the ROM 802 and the RAM 803 are connected to each other via a bus 804. An input/output (I/O) interface 805 is also connected to the bus 804.

In general, the following apparatuses may be connected to the I/O interface 805: an input apparatus 806, including, for example, a touch screen, a touch pad, a keyboard, a mouse, a camera, a microphone, an accelerometer, a gyroscope, and the like; an output apparatus 807, including, for example, a liquid crystal display (LCD), a speaker, a vibrator, and the like; a storage apparatus 808, including, for example, a magnetic tape, a hard disk, and the like; and a communication apparatus 809. The communication apparatus 809 may allow the electronic device 800 to communicate in a wireless or wired manner with other devices to exchange data. Although the electronic device 800 having various apparatuses is illustrated, it should be understood that not all illustrated apparatuses are required to be implemented or provided. More or fewer apparatuses may alternatively be implemented or provided.

In particular, according to the embodiments of the present disclosure, the processes described above with reference to the flowcharts may be implemented as computer software programs. For example, the embodiments of the present disclosure include a computer program product, which includes a computer program carried on a computer-readable medium, and the computer program contains program codes for executing the method illustrated in the flowcharts. In such embodiments, the computer program may be downloaded and installed from a network via the communication apparatus 809, or installed from the storage apparatus 808, or installed from the ROM 802. When the computer program is executed by the processing apparatus 801, the above functions defined in the method of the embodiments of the present disclosure are executed.

It should be noted that, the computer-readable medium described above in the present disclosure may be either a computer-readable signal medium or a computer-readable storage medium, or any combination of the two. The computer-readable storage medium may be, for example, but is not limited to, an electronic, magnetic, optical, electromagnetic, infrared, or semiconductor system, apparatus or device, or a combination of any of the above. More specific examples of the computer-readable storage medium may include, but are not limited to: an electrical connection having one or more wires, a portable computer magnetic disk, a hard disk, a random access memory (RAM), a read-only memory (ROM), an erasable programmable read-only memory (EPROM or a flash memory), an optical fiber, a portable compact disc-read-only memory (CD-ROM), an optical storage device, a magnetic storage device, or any suitable combination of the above. In the present disclosure, the computer-readable storage medium may be any tangible medium that contains or stores a program, wherein the program may be used by or in conjunction with an instruction execution system, apparatus or device. In the present disclosure, the computer-readable signal medium may include a data signal that is propagated in a baseband or as part of a carrier, wherein the data signal carries computer-readable program codes. Such propagated data signal may take many forms, including, but not limited to, electromagnetic signals, optical signals, or any suitable combination thereof. The computer-readable signal medium may also be any computer-readable medium other than the computer-readable storage medium, and the computer-readable signal medium may send, propagate or transport the program for use by or in conjunction with the instruction execution system, apparatus or device. Program codes contained on the computer-readable medium may be transmitted with any suitable medium, including, but not limited to: an electrical wire, an optical cable, RF (radio frequency), and the like, or any suitable combination thereof.

In some embodiments, a client and a server may perform communication by using any currently known or future-developed network protocol, such as an HTTP (HyperText Transfer Protocol), and may be interconnected with any form or medium of digital data communication (e.g., a communication network). Examples of the communication network include a local area network ("LAN"), a wide area network ("WAN"), an international network (e.g., the Internet), and a peer-to-peer network (e.g., an ad hoc peer-to-peer network), as well as any currently known or future-developed network.

The computer-readable medium may be contained in the above electronic device; and it may also be present separately and is not assembled in the electronic device.

The computer-readable medium carries one or more programs that, when executed by the electronic device, cause the electronic device to execute the above method of the present disclosure.

Computer program codes for executing the operations of the present disclosure may be written in one or more programming languages or combinations thereof. The programming languages include object-oriented programming languages, such as Java, Smalltalk, C++, and conventional procedural programming languages, such as the "C" language or similar programming languages. The program codes may be executed entirely on a user computer, executed partly on the user computer, executed as a stand-alone software package, executed partly on the user computer and partly on a remote computer, or executed entirely on the remote computer or a server. In the case involving the remote computer, the remote computer may be connected to the user computer through any type of network, including a local area network (LAN) or a wide area network (WAN), or it may be connected to an external computer (e.g., through the Internet using an Internet service provider).

The flowcharts and block diagrams in the drawings illustrate the system architecture, functions and operations of possible implementations of systems, methods and computer program products according to various embodiments of the present disclosure. In this regard, each block in the flowcharts or block diagrams may represent a part of a module, a program segment, or a code, which contains one or more executable instructions for implementing specified logical functions. It should also be noted that, in some alternative implementations, the functions annotated in the block may occur out of the sequence annotated in the drawings. For example, two blocks shown in succession may, in fact, be executed substantially concurrently, or the blocks may sometimes be executed in a reverse sequence, depending upon the functions involved. It should also be noted that each block in the block diagrams and/or flowcharts, and combinations of the blocks in the block diagrams and/or flowcharts may be implemented by dedicated hardware-based systems for executing specified functions or operations, or combinations of dedicated hardware and computer instructions.

The units involved in the described embodiments of the present disclosure may be implemented in a software or hardware manner. The names of the units do not constitute limitations of the units themselves in a certain case.

The functions described herein above may be executed, at least in part, by one or more hardware logical components. For example, without limitation, example types of the hardware logical components that may be used include: a field programmable gate array (FPGA), an application specific integrated circuit (ASIC), an application specific standard product (ASSP), a system on chip (SOC), a complex programmable logical device (CPLD), and so on.

In the context of the present disclosure, a machine-readable medium may be a tangible medium, which may contain or store a program for use by or in conjunction with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium would include an electrical connection based on one or more wires, a portable computer disk, a hard disk, a random access memory (RAM), a read-only memory (ROM), an erasable programmable read-only memory (EPROM or a flash memory), an optical fiber, a compact disc-read-only memory (CD-ROM), an optical storage device, a magnetic storage device, or any suitable combination thereof.

According to one or more embodiments of the present disclosure, a method for extending reality display is provided, including:

acquiring a view image corresponding to each user in response to a trigger operation for multi-user picture sharing;

generating an extended reality spherical model according to the view image corresponding to each user, wherein the extended reality spherical model is formed by splicing the view images corresponding to the users; and displaying, at a head-mounted end of each user, a picture corresponding to the extended reality spherical model.

According to one or more embodiments of the present disclosure, a method is provided, the step of acquiring the view image corresponding to each user in response to a trigger operation for multi-user picture sharing comprises:

acquiring a panoramic image of each user in an extended reality scene thereof in response to a trigger operation for multi-user picture sharing;

segmenting the panoramic image of each user respectively to obtain a view image corresponding to each user.

According to one or more embodiments of the present disclosure, a method is provided, the step of acquiring the panoramic image of each user in the extended reality scene thereof includes:

performing segmentation processing on the extended reality spherical model corresponding to each user, to obtain the panoramic image of each user in the extended reality scene thereof.

According to one or more embodiments of the present disclosure, a method is provided, the step of responding to the trigger operation for multi-user picture sharing includes:

in respond to a trigger operation for a picture sharing request, which is initiated by a master user, and in respond to a trigger operation for accepting the picture sharing request by a secondary user.

According to one or more embodiments of the present disclosure, a method is provided, the view image is a field-of-view picture of the user in the current extended reality scene.

According to one or more embodiments of the present disclosure, a method is provided, the step: respectively segmenting the panoramic image of each user, so as to obtain the view image corresponding to each user, includes:

segmenting the panoramic image of each user according to a preset field-of-view allocation rule to obtain the view image corresponding to each user.

According to one or more embodiments of the present disclosure, a method is provided, the step of segmenting the panoramic image of each user according to the preset field-of-view allocation rule includes:

respectively segmenting the panoramic image of the master user and the panoramic images of the secondary users according to the size of a preset field of view of the master user and the number of secondary users.

According to one or more embodiments of the present disclosure, a method is provided, displaying, at the head-mounted end of each user, the picture corresponding to the extended reality spherical model, includes:

acquiring sensor data of the head-mounted end, which is uploaded by the master user;

according to the sensor data, determining, from the extended reality spherical model, a view image corresponding to the current field of view of the master user; and displaying the view image at the head-mounted end of the master user.

According to one or more embodiments of the present disclosure, a method is provided, further including:

in response to a trigger operation for local loading, acquiring a panoramic video image of a local archive of an extended reality device;

segmenting at least one panoramic video image according to the preset field-of-view allocation rule to obtain at least one view image;

splicing the at least one view image to generate the extended reality spherical model; and displaying, at the head-mounted end of the extended reality device, the picture corresponding to the extended reality spherical model.

According to one or more embodiments of the present disclosure, an apparatus for extending reality display is provided, including:

an acquisition module configured to acquire a view image corresponding to each user in response to a trigger operation for multi-user picture sharing;

a processing module configured to generate an extended reality spherical model according to the view image corresponding to each user, wherein the extended reality spherical model is formed by splicing the view images corresponding to the users; and a display module configured to display, at a head-mounted end of each user, a picture corresponding to the extended reality spherical model.

According to one or more embodiments of the present disclosure, an electronic device is provided, including: at least one memory and at least one processor, wherein the at least one memory is configured to store program codes, and the at least one processor is configured to call the program codes stored in the at least one memory, so as to execute the above method.

According to one or more embodiments of the present disclosure, a computer-readable storage medium is provided, which is configured to store program codes, wherein the program codes cause, when operated by a processor, the processor to execute the above method.

What have been described above are only preferred embodiments of the present disclosure and illustrations of the technical principles employed. It should be understood by those skilled in the art that the disclosure scope involved in the preset disclosure is not limited to the technical solutions formed by specific combinations of the above technical features, and meanwhile should also include other technical solutions formed by any combinations of the above technical features or equivalent features thereof without departing from the concept of the above disclosure, for example, technical solutions formed by mutual replacement of the above features with technical features having similar functions disclosed in the present disclosure (but is not limited to).

In addition, although various operations are depicted in a particular sequence, this should not be understood as requiring that these operations are executed in the particular sequence shown or in a precedence order. In certain environments, multitasking and parallel processing may be advantageous. Similarly, although several specific implementation details have been contained in the above discussion, these should not be construed as limiting the scope of the present disclosure. Certain features, which are described in the context of separate embodiments, may also be implemented in combination in a single embodiment. Conversely, various features, which are described in the context of a single embodiment, may also be implemented in a plurality of embodiments separately or in any suitable sub-combination.

Although the present theme has been described in language specific to structural features and/or methodological actions, it should be understood that the theme defined in the appended claims is not necessarily limited to the specific features or actions described above. Rather, the specific features and actions described above are merely example forms for implementing the claims.

We claim:

1. A method of extending reality display, comprising:

acquiring a view image corresponding to each user in response to a trigger operation for multi-user picture sharing;

generating an extended reality spherical model according to the view image corresponding to each user, the extended reality spherical model being formed by splicing the view image corresponding to each user, comprising:

acquiring one or more spherical models corresponding to each user, wherein the one or more spherical models are rendered by an engine based on sensor data uploaded by each user;

acquiring images from the one or more spherical models; and displaying, at a head-mounted end of a user, a picture corresponding to the extended reality spherical model.

2. The method of claim 1, wherein acquiring the view image corresponding to each user in response to a trigger operation for multi-user picture sharing comprises:

acquiring a panoramic image of each user in an extended reality scene thereof in response to a trigger operation for multi-user picture sharing;

segmenting the panoramic image of each user respectively to obtain a view image corresponding to each user.

3. The method of claim 2, wherein acquiring the panoramic image of each user in the extended reality scene thereof comprises:

performing segmentation processing on the extended reality spherical model corresponding to each user to obtain the panoramic image of each user in the extended reality scene thereof.

4. The method of claim 1, wherein in response to the trigger operation for multi-user picture sharing comprises:

in response to a trigger operation for a picture sharing request initiated by a master user, and in response to a trigger operation for accepting the picture sharing request by a secondary user.

5. The method of claim 1, wherein the view image is an angle-of-view picture of the user in a current extended reality scene.

6. The method of claim 2, wherein segmenting the panoramic image of each user respectively to obtain the view image corresponding to each user comprises:

segmenting the panoramic image of each user according to a preset field-of-view allocation rule to obtain the view image corresponding to each user.

7. The method of claim 6, wherein segmenting the panoramic image of each user according to the preset field-of-view allocation rule comprises:

segmenting the panoramic image of the master user and the panoramic images of the secondary users respectively according to the size of a preset field of view of the master user and a number of secondary users.

8. The method of claim 4, wherein displaying, at the head-mounted end of the user, the picture corresponding to the extended reality spherical model comprises:

acquiring sensor data of the head-mounted end uploaded by the master user;

determining, according to the sensor data and from the extended reality spherical model, a view image corresponding to the current angle of view of the master user; and displaying the view image at the head-mounted end of the master user.

9. The method of claim 1, further comprising:

in response to a trigger operation for local loading, acquiring a panoramic video image of a local archive of an extended reality device;

segmenting at least one panoramic video image according to the preset field-of-view allocation rule to obtain at least one view image;

splicing the at least one view image to generate the extended reality spherical model; and displaying, at the head-mounted end of the extended reality device, the picture corresponding to the extended reality spherical model.

10. An electronic device, comprising:

at least one memory and at least one processor, wherein the at least one memory is configured to store program codes, and the at least one processor is configured to call the program codes stored in the at least one memory to:

acquire a view image corresponding to each user in response to a trigger operation for multi-user picture sharing;

generate an extended reality spherical model according to the view image corresponding to each user, the extended reality spherical model being formed by splicing the view image corresponding to each user, comprising:

acquiring one or more spherical models corresponding to each user, wherein the one or more spherical models are rendered by an engine based on sensor data uploaded by each user;

acquiring images from the one or more spherical models; and display, at a head-mounted end of a user, a picture corresponding to the extended reality spherical model.

11. The electronic device of claim 10, wherein acquiring the view image corresponding to each user in response to a trigger operation for multi-user picture sharing comprises:

acquiring a panoramic image of each user in an extended reality scene thereof in response to a trigger operation for multi-user picture sharing;

segmenting the panoramic image of each user respectively to obtain a view image corresponding to each user.

12. The electronic device of claim 11, wherein acquiring the panoramic image of each user in the extended reality scene thereof comprises:

performing segmentation processing on the extended reality spherical model corresponding to each user to obtain the panoramic image of each user in the extended reality scene thereof.

13. The electronic device of claim 10, wherein in response to the trigger operation for multi-user picture sharing comprises:

in response to a trigger operation for a picture sharing request initiated by a master user, and in response to a trigger operation for accepting the picture sharing request by a secondary user.

14. The electronic device of claim 10, wherein the view image is an angle-of-view picture of the user in a current extended reality scene.

15. The electronic device of claim 11, wherein segmenting the panoramic image of each user respectively to obtain the view image corresponding to each user comprises:

segmenting the panoramic image of each user according to a preset field-of-view allocation rule to obtain the view image corresponding to each user.

16. The electronic device of claim 15, wherein segmenting the panoramic image of each user according to the preset field-of-view allocation rule comprises:

segmenting the panoramic image of the master user and the panoramic images of the secondary users respectively according to the size of a preset field of view of the master user and a number of secondary users.

17. The electronic device of claim 13, wherein displaying, at the head-mounted end of the user, the picture corresponding to the extended reality spherical model comprises:

acquiring sensor data of the head-mounted end uploaded by the master user;

determining, according to the sensor data and from the extended reality spherical model, a view image corresponding to the current angle of view of the master user; and displaying the view image at the head-mounted end of the master user.

18. The electronic device of claim 10, further comprising:

in response to a trigger operation for local loading, acquiring a panoramic video image of a local archive of an extended reality device;

segmenting at least one panoramic video image according to the preset field-of-view allocation rule to obtain at least one view image;

splicing the at least one view image to generate the extended reality spherical model; and displaying, at the head-mounted end of the extended reality device, the picture corresponding to the extended reality spherical model.

19. A non-transient computer-readable storage medium, configured to store program codes, wherein the program codes cause, when operated by a computer device, cause the computer device to:

acquire a view image corresponding to each user in response to a trigger operation for multi-user picture sharing;

generate an extended reality spherical model according to the view image corresponding to each user, the extended reality spherical model being formed by splicing the view image corresponding to each user, comprising:

acquiring one or more spherical models corresponding to each user, wherein the one or more spherical models are rendered by an engine based on sensor data uploaded by each user; and acquiring images from the one or more spherical models; and display, at a head-mounted end of a user, a picture corresponding to the extended reality spherical model.

20. The non-transient computer-readable storage medium of claim 19, wherein acquiring the view image corresponding to each user in response to a trigger operation for multi-user picture sharing comprises:

acquiring a panoramic image of each user in an extended reality scene thereof in response to a trigger operation for multi-user picture sharing;

segmenting the panoramic image of each user respectively to obtain a view image corresponding to each user.

* * * * *